(12) United States Patent
Adachi

(10) Patent No.: US 9,971,558 B2
(45) Date of Patent: May 15, 2018

(54) INFORMATION PROCESSING APPARATUS

(71) Applicant: BROTHER KOGYO KABUSHIKI KAISHA, Nagoya-shi, Aichi-ken (JP)

(72) Inventor: Toyoshi Adachi, Iwakura (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days. days.

(21) Appl. No.: 14/227,861

(22) Filed: Mar. 27, 2014

(65) Prior Publication Data

US 2015/0092208 A1 Apr. 2, 2015

(30) Foreign Application Priority Data

Sep. 30, 2013 (JP) .................................. 2013-205413

(51) Int. Cl.
*G06F 3/12* (2006.01)
*H04N 1/00* (2006.01)

(52) U.S. Cl.
CPC .......... *G06F 3/1276* (2013.01); *G06F 3/1204* (2013.01); *G06F 3/128* (2013.01); *G06F 3/1211* (2013.01); *G06F 3/1225* (2013.01); *H04N 1/00278* (2013.01); *H04N 1/00339* (2013.01);
(Continued)

(58) Field of Classification Search
CPC ...... G06F 3/1276; G06F 3/1211; G06F 3/128; G06F 3/1225; G06F 3/1204; H04N 1/00278; H04N 1/00339; H04N 1/00965; H04N 2201/0041; H04N 2201/0051
See application file for complete search history.

(56) References Cited

U.S. PATENT DOCUMENTS

| 2005/0190399 A1* | 9/2005 | Nakaoka .............. G06F 3/1204 358/1.15 |
| 2008/0055632 A1* | 3/2008 | Oshiumi et al. ............. 358/1.15 |
| 2008/0055640 A1 | 3/2008 | Takahashi et al. |

(Continued)

FOREIGN PATENT DOCUMENTS

| JP | 2002-010025 A | 1/2002 |
| JP | 2007-011799 A | 1/2007 |

(Continued)

OTHER PUBLICATIONS

Office Action issued in related Japanese patent application No. 2013-205413 dated Jun. 13, 2017.

*Primary Examiner* — Iriana Cruz
(74) *Attorney, Agent, or Firm* — Merchant & Gould P.C.

(57) ABSTRACT

An information processing apparatus includes: an image reading unit configured to perform image reading; an interface to which an external memory is detachably attached; an input unit configured to receive an instruction of a user; a storage unit configured to store at least one of a reading driver of controlling the image reading unit and a reading driver-command of acquiring the reading driver from an external; and a control unit configured to: receive, from the input unit, a reading instruction of storing the image data, which is acquired by performing image reading, in the external memory attached to the interface, perform, when receiving the reading instruction of storing the image data, a reading driver-data storing process of storing both the image data and one of the reading driver and the reading driver-command in the external memory attached to the interface.

22 Claims, 19 Drawing Sheets

(52) U.S. Cl.
CPC . *H04N 1/00965* (2013.01); *H04N 2201/0041* (2013.01); *H04N 2201/0051* (2013.01)

(56) References Cited

U.S. PATENT DOCUMENTS

| | | | | |
|---|---|---|---|---|
| 2008/0198408 A1* | 8/2008 | Sugiura | ................ | G06F 3/1204 358/1.15 |
| 2008/0239364 A1* | 10/2008 | Nelson | ................ | G06F 3/1222 358/1.15 |
| 2009/0019191 A1 | 1/2009 | Ito | | |
| 2010/0189459 A1* | 7/2010 | Takase | ................ | G03G 15/55 399/82 |
| 2011/0026069 A1* | 2/2011 | Jesudason et al. | .......... | 358/1.15 |

FOREIGN PATENT DOCUMENTS

| | | |
|---|---|---|
| JP | 2007-160525 A | 6/2007 |
| JP | 2008-059238 A | 3/2008 |
| JP | 2008-129653 A | 6/2008 |
| JP | 2008-252893 A | 10/2008 |
| JP | 2009-021948 A | 1/2009 |
| JP | 2011-232490 A | 11/2011 |

\* cited by examiner

FIG. 12A
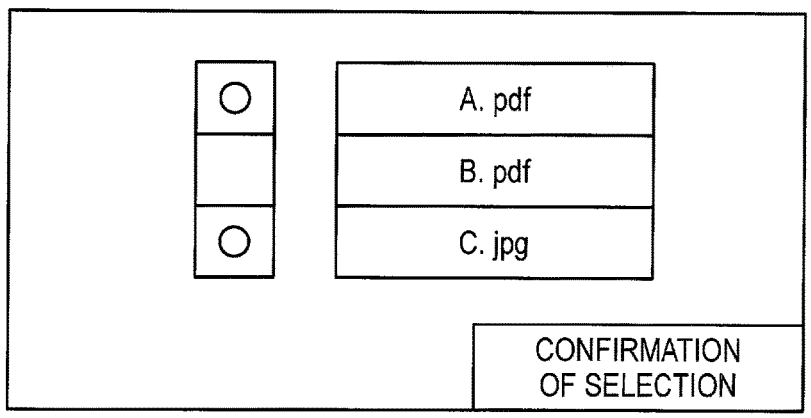
FIG. 12B
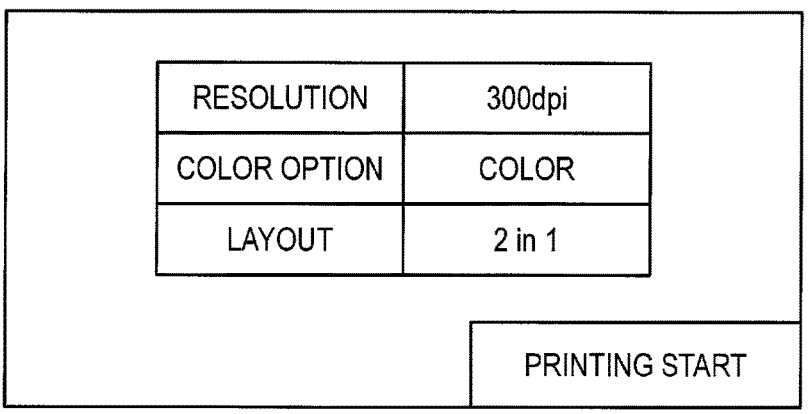
FIG. 13
PRINTER DRIVER HAS BEEN ALREADY INSTALLED IN PCS "A" AND "B".
IN CASE OF PERFORMING PRINTING BY PRINT DRIVER, PRINTING PROCESS CAN BE PERFORMED AT HIGHER SPEED AND AT HIGHER IMAGE QUALITY.
OK

FIG. 18

MANAGEMENT FILE

[MFC-9970CDW 10.123.10.1]
USBScan:3
USBPrint:3

[MFC-8890DN 10.123.10.2]
USBScan:2
USBPrint:1

[PC:A]
MFC-9970CDW Scan 10.123.10.1
MFC-9970CDW Print 10.123.10.1
MFC-8890DN Scan 10.123.10.2
MFC-8890DN Print 10.123.10.2

[PC:B]
MFC-9970CDW Scan 10.123.10.1
MFC-9970CDW Print 10.123.10.1
MFC-8890DN Scan 10.123.10.2
MFC-8890DN Print 10.123.10.2

[PC:C]
MFC-8890DN Scan 10.123.10.2

FIG. 21A

MFP SIDE MANAGEMENT FILE

[USB IDENTIFICATION NUMBER AABBCC001]
USBScan:3
USBPrint:3

[USB IDENTIFICATION NUMBER CCBBAA002]
USBScan:2
USBPrint:1

[PC:A]
Scan
Print

[PC:B]
Scan
Print

FIG. 21B

USB MEMORY SIDE MANAGEMENT FILE

[PC:A]

[PC:B]

INFORMATION PROCESSING APPARATUS

CROSS-REFERENCE TO RELATED APPLICATION

This application claims priority from Japanese Patent Application No. 2013-205413 filed on Sep. 30, 2013, the entire subject matter of which is incorporated herein by reference.

TECHNICAL FIELD

This disclosure relates to an information processing apparatus having at least one of an image reading unit configured to perform image reading of reading images formed on documents and an image recording unit configured to perform image recording of recording images on recording media.

BACKGROUND

There is a technology for installing a driver in an information terminal such as a personal computer and remotely controlling a printer or a scanner through the driver. According to this technology, it is possible to use the information terminal to remotely use the function of the printer or the scanner. Meanwhile, there is known a technology for attaching an external memory to a printer or a scanner, and performing control such that the printer prints image data stored in the external memory or image data generated by the scanner is stored in the external memory. According to this technology, a user can use the printer or the scanner, without installing a driver in an information terminal.

SUMMARY

However, in order to sufficiently use the function of the printer or the scanner, it is preferable to install the driver in the information terminal and then use the corresponding function. Meanwhile, it is complicated for the user to search for the driver corresponding to the printer or the scanner and prepare an installation environment.

This disclosure provides at least an information processing apparatus possible to prepare an installation environment of a driver without putting time and effort.

An information processing apparatus of this disclosure includes: an image reading unit configured to perform image reading of reading an image formed on a document; an interface to which an external memory is detachably attached; an input unit configured to receive an instruction of a user; a storage unit configured to store at least one of a reading driver of controlling the image reading unit and a reading driver-command of acquiring the reading driver from an external; and a control unit. The controller unit is configured to: receive, from the input unit, a reading instruction of storing the image data, which is acquired by performing image reading, in the external memory attached to the interface, and perform, when receiving the reading instruction of storing the image data, a reading driver-data storing process of storing both the image data and one of the reading driver and the reading driver-command in the external memory attached to the interface.

BRIEF DESCRIPTION OF THE DRAWINGS

The foregoing and additional features and characteristics of this disclosure will become more apparent from the following detailed descriptions considered with the reference to the accompanying drawings, wherein:

FIGS. 12A and 12B are views illustrating the contents of a print file selection display and a print setting display of FIG. 11, respectively;

FIG. 13 is a view illustrating the contents of a driver use proposal display shown in FIG. 11;

FIG. 18 is a view illustrating the contents of a management file shown in FIG. 2;

FIGS. 21A and 21B are views illustrating the contents of management files according to the first modification, respectively.

DETAILED DESCRIPTION

Hereinafter, an image recording apparatus according to an illustrative embodiment will be described in detail, with reference to the accompanying drawings. The present illustrative embodiment is obtained by applying this disclosure to a multi-function peripheral (MFP) which is an information processing apparatus having a scanning function and a printing function.

Figure 1:
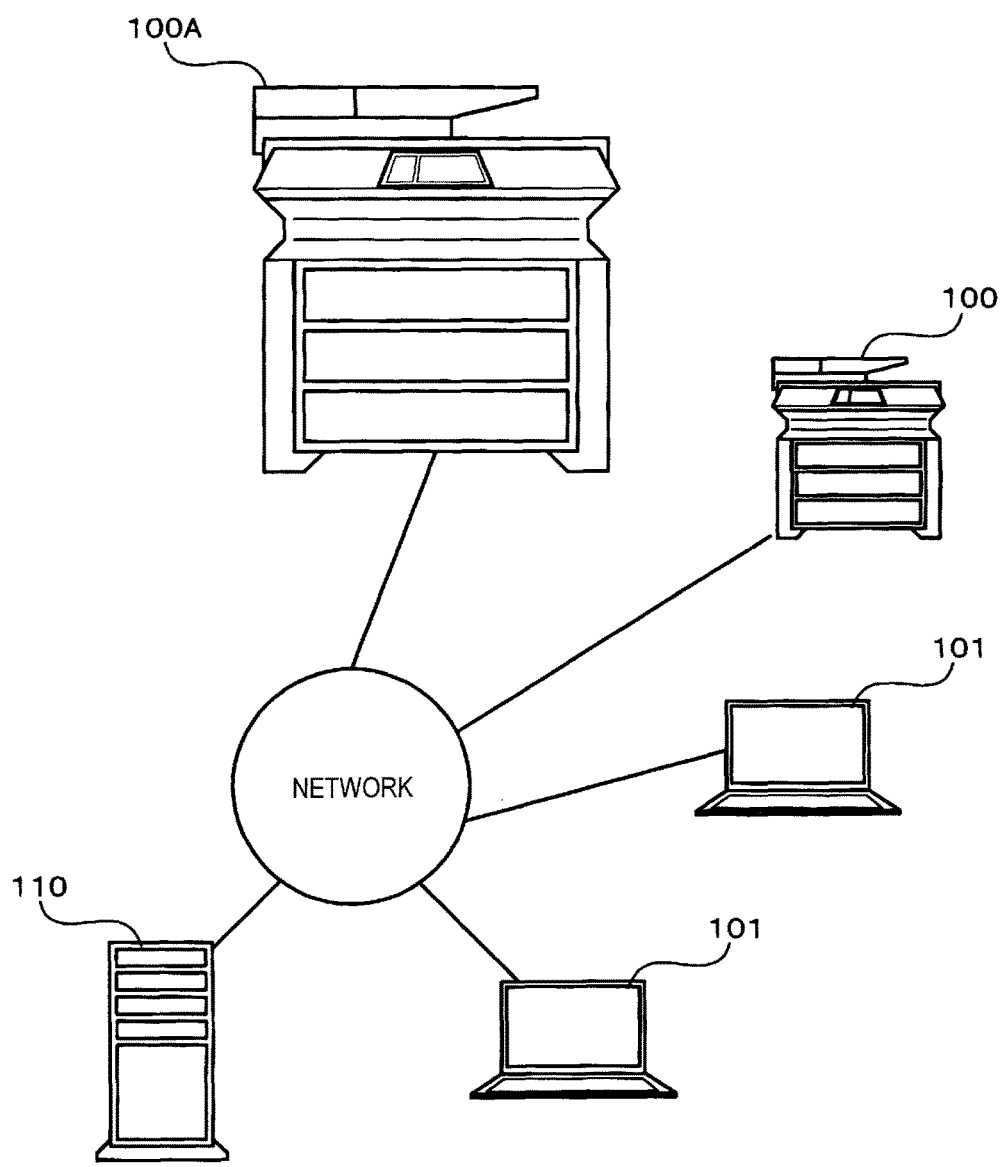
FIG. 1 is a view illustrating the external appearance of a multi-function peripheral (MFP) according to a first illustrative embodiment of this disclosure.

As shown in FIG. 1, PCs 101, a MFP 100 (an information processing apparatus) having a printing function and a scanning function, and a server 110 having stored the latest driver for controlling the MFP 100 are connected to a network.

The MFP 100 may be capable of color printing, or may be dedicated for monochrome printing. In the present illustrative embodiment, it is assumed that the MFP 100 is capable of color printing. Also, a printing system may be an electrophotographic system, or may be an inkjet system. Also, the MFP 100 may be capable of color reading, or may be dedicated for monochrome reading. In the present illustrative embodiment, it is assumed that a scanner 11 (see FIG. 2) is capable of color reading. Also, a reading element of the scanner 11 may be a CCD, or may be a CIS.

Figure 2:
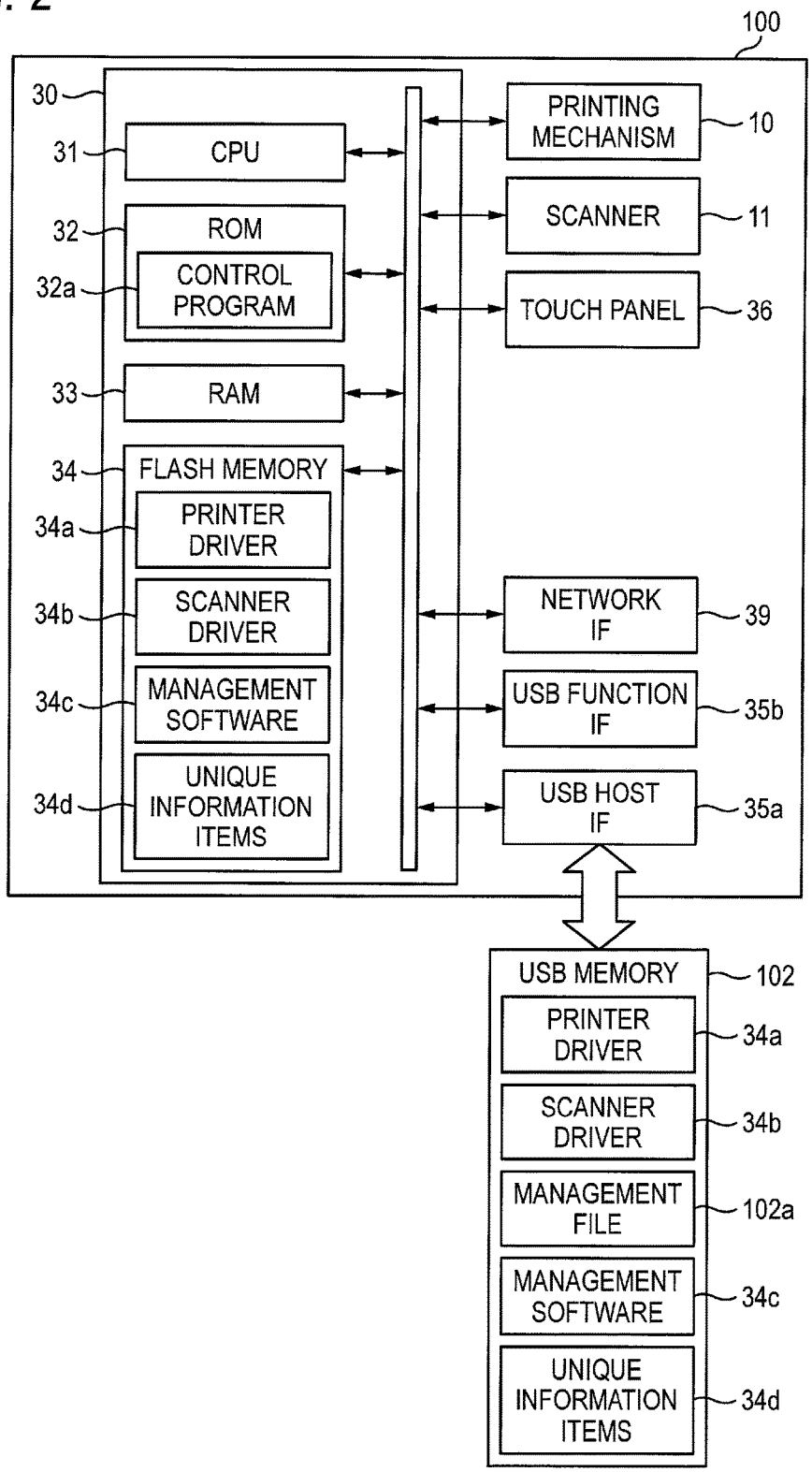
FIG. 2 is a view illustrating the functional blocks of the MFP shown in FIG. 1.

Subsequently, a schematic configuration of the MFP 100 will be described. As shown in FIG. 2, the MFP 100 has a control unit 30 which includes a CPU 31, a ROM 32, a RAM 33, and a flash memory 34. Also, the control unit 30 is electrically connected to a printing mechanism (an image recording unit) 10 for printing images onto sheets, the scanner (an image reading unit) 11 for reading images of documents, a touch panel 36, a network interface 39, an universal serial bus (USB) host interface 35a, and a USB function interface 35b. A USB memory 102 can be attached to the USB host interface 35a. The USB memory 102 can also be attached to a USB port (not shown) of a PC 101. Therefore, data exchange is possible between each PC 101 and the MFP 100 through the USB memory 102.

In the ROM 32, there have been stored firmware which is a control program 32a for controlling the MFP 100, a variety of options, initial values, and the like. The RAM 33 and the flash memory 34 can be used as a work area into which a variety of control programs can be read, or as a storage area for temporarily storing data.

Also, in the flash memory 34, there have been stored a printer driver 34a which is used in a PC 101 to control the printing function of the MFP 100, a scanner driver 34b which is used in the PC 101 to control the scanning function of the MFP 100, and management software 34c to be installed and function in the PC 101. The CPU 31 regularly confirms the versions of a printer driver 34a and a scanner driver 34b of the server 110. If it is confirmed that the versions of the printer driver 34a and the scanner driver 34b stored in the flash memory 34 are older than the versions of the printer driver 34a and the scanner driver 34b of the server 110, the CPU 31 downloads the latest printer driver 34a and the latest scanner driver 34b from the server 110, and overwrites (updates) the printer driver 34a and the scanner driver 34b of the flash memory 34 with the latest printer driver 34a and the latest scanner driver 34b. Further, in the flash memory 34, there have been stored unique information items 34d which are usable to perform data communication. The unique information items 34d are, for example, an IP address and a port number which are usable for TCP/IP protocol communication. The port number represents a port for the PC 101 to use the management software 34c, thereby accessing the MFP 100.

The CPU 31 controls each component of the MFP 100 while storing process results in the RAM 33 or the flash memory 34, according to the control program 32a read from the ROM 32 and signals transmitted from a variety of sensors.

The touch panel 36 is a user information having an input function and a display function, and displays an operating state or receives an input operation of the user.

The network interface 39 is configured to be capable of data communication with other external devices (the PCs 101 and the server 110) through the network. As a communication protocol, TCP/IP is used.

Both of the USB host interface 35a and the USB function interface 35b are interfaces of a USB standard. The USB memory 102 can be attached to or detached from the USB host interface 35a. The user can attach the USB memory to the USB host interface 35a, and print image data stored in the USB memory 102, or store image data read by the scanner 11, in the USB memory. Also, the USB host interface 35a is usable for any other recording medium, such as a hard disk having an USB interface. The USB function interface 35b is configured to perform data communication with an external device (a host computer) through a USB cable.

In the MFP 100, it is possible to perform "DIRECT SCANNING" of storing image data generated by the scanner 11, in the USB memory 102 attached to the USB host interface 35a, and "DIRECT PRINTING" of printing image data stored in the USB memory 102 attached to the USB host interface 35a, by the printing mechanism 10. Further, with respect to the PC 101 having the scanner driver 34b installed therein for controlling the scanner 11 of the MFP 100, it is possible to perform "DRIVER SCANNING" of transmitting image data generated by the scanner 11, to the corresponding PC 101 through the network. Also, in a case of receiving image data and a command from the PC 101 having the printer driver 34a installed therein for controlling the printing mechanism 10 of the MFP 100, it is possible to perform "DRIVER PRINTING" of printing the received image data by the printing mechanism 10.

An operation procedure of the MFP 100 in a case of performing "DIRECT SCANNING" or "DIRECT PRINTING" will be described.

Figure 3:
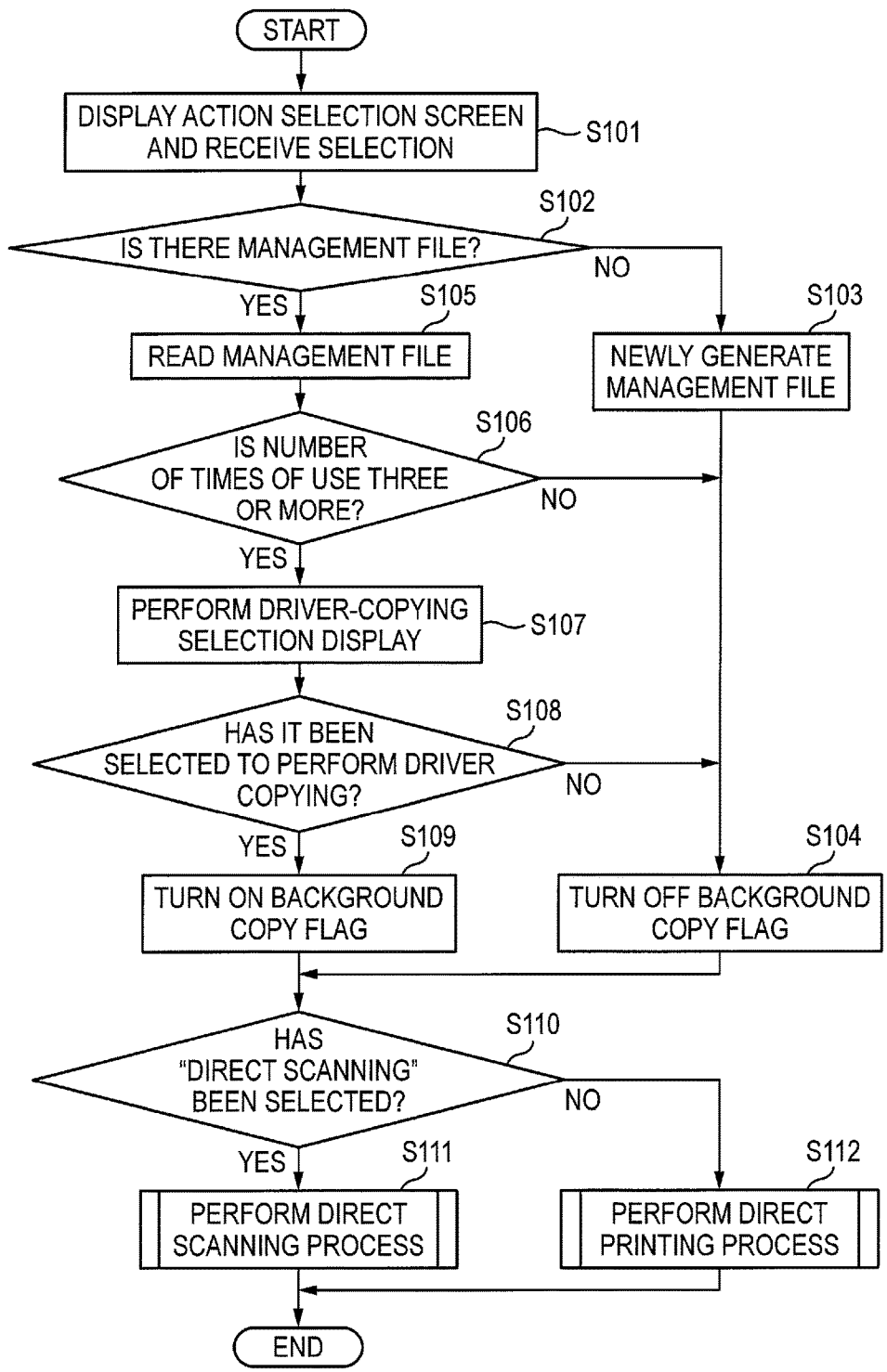
FIG. 3 is a flow chart illustrating an operation procedure of the MFP shown in FIG. 1.
Figure 4:
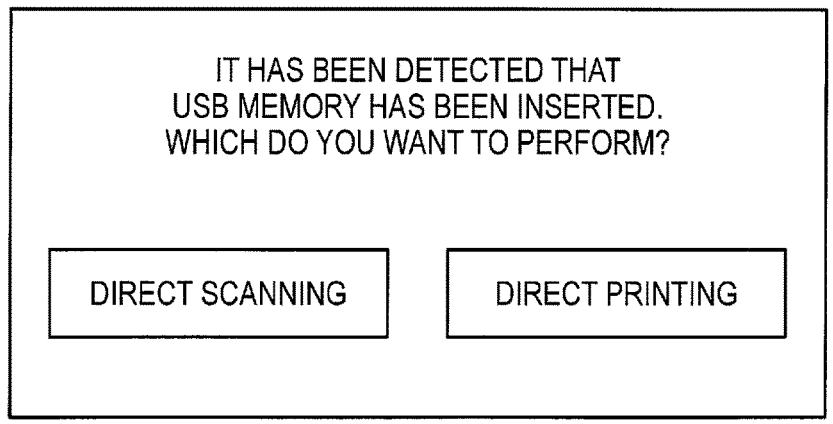
FIG. 4 is a view illustrating the contents of an action selection display shown in FIG. 3.

As shown in FIG. 3, if the USB memory 102 is attached to the USB host interface 35a of the MFP 100, in STEP S101, the CPU 31 performs control such that the touch panel 36 displays an action selection screen of "DIRECT SCANNING" and "DIRECT PRINTING" shown in FIG. 4, and receives selection of any one action from the user. Subsequently, in STEP S102, the CPU 31 determines whether a management file 102a has been stored in the USB memory 102. If it is determined that the management file 102a has not been stored in the USB memory 102 ("NO" in STEP S102), in STEP S103, the CPU 31 newly generates the management file 102a and stores the management file 102a in the USB memory 102. Thereafter, in STEP S104, the CPU 31 turns off a background copy flag. Then, in STEP S110, the CPU 11 determines which the user has selected from "DIRECT SCANNING" and "DIRECT PRINTING".

If it is determined that the management file 102a has been stored in the USB memory 102 ("YES" in STEP S102), in STEP S105, the CPU 31 reads the management file 102a. In the management file 102a, there have been stored the number of times of use of scanning of "DIRECT SCANNING" using the corresponding USB memory 102 (the cumulative number USBScan of times of reading), and the number of times of use of printing of "DIRECT PRINTING" using the corresponding USB memory 102 (a cumulative recording number) (see FIG. 18). In STEP S106, the CPU 31 determines whether the sum of the number of times of use of scanning and the number of times of use of printing is three or more. If it is determined that the sum is not three or more ("NO" in STEP S106), the CPU 31 proceeds to STEP S104 in which the CPU 31 turns off the background copy flag.

Figure 5:
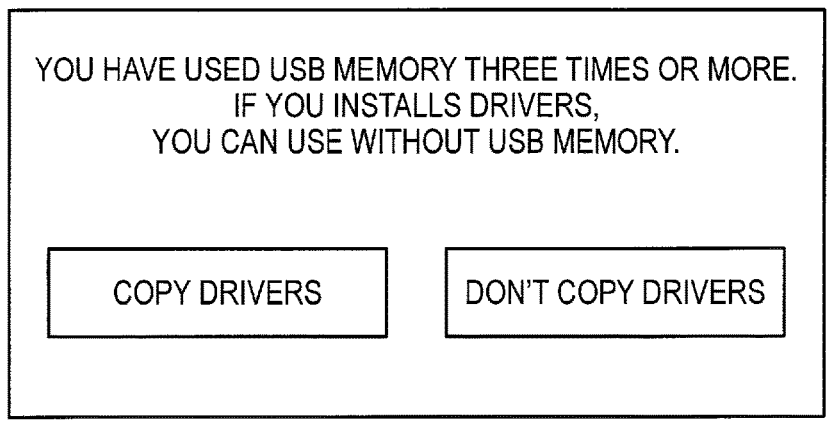
FIG. 5 is a view illustrating the contents of a driver-copying selection display shown in FIG. 3.

If it is determined that the sum is three or more ("YES" in STEP S106), in STEP S107, the CPU 31 performs control such that the touch panel 36 displays a driver-copying selection screen for prompting the user to select whether to copy the drivers for controlling the MFP 100, into the USB memory 102, as shown in FIG. 5. Subsequently, in STEP S108, the CPU 31 determines whether the user has selected to perform driver copying. If it is determined that the user has selected not to perform driver copying ("NO" in STEP S108), the CPU 31 proceeds to STEP S104 in which the CPU 31 turns off the background copy flag. Meanwhile, if it is determined that the user has selected to perform driver copying ("YES" in STEP S108), in STEP S109, the CPU 31 turns on the background copy flag.

Further, in the above described selection of STEP S110, the CPU 31 determines whether the user has selected "DIRECT SCANNING". If it is determined that the user has selected "DIRECT SCANNING" ("YES" in STEP S110), the CPU 31 performs a direct scanning process in STEP S111, and then finishes the flow chart of FIG. 3. Meanwhile, if it is determined that the user has not selected "DIRECT SCANNING", that is, that the user has selected "DIRECT PRINTING" ("NO" in STEP S110), the CPU 31 performs a direct printing process in STEP S112, and then finishes the flow chart of FIG. 3.

Figure 6:
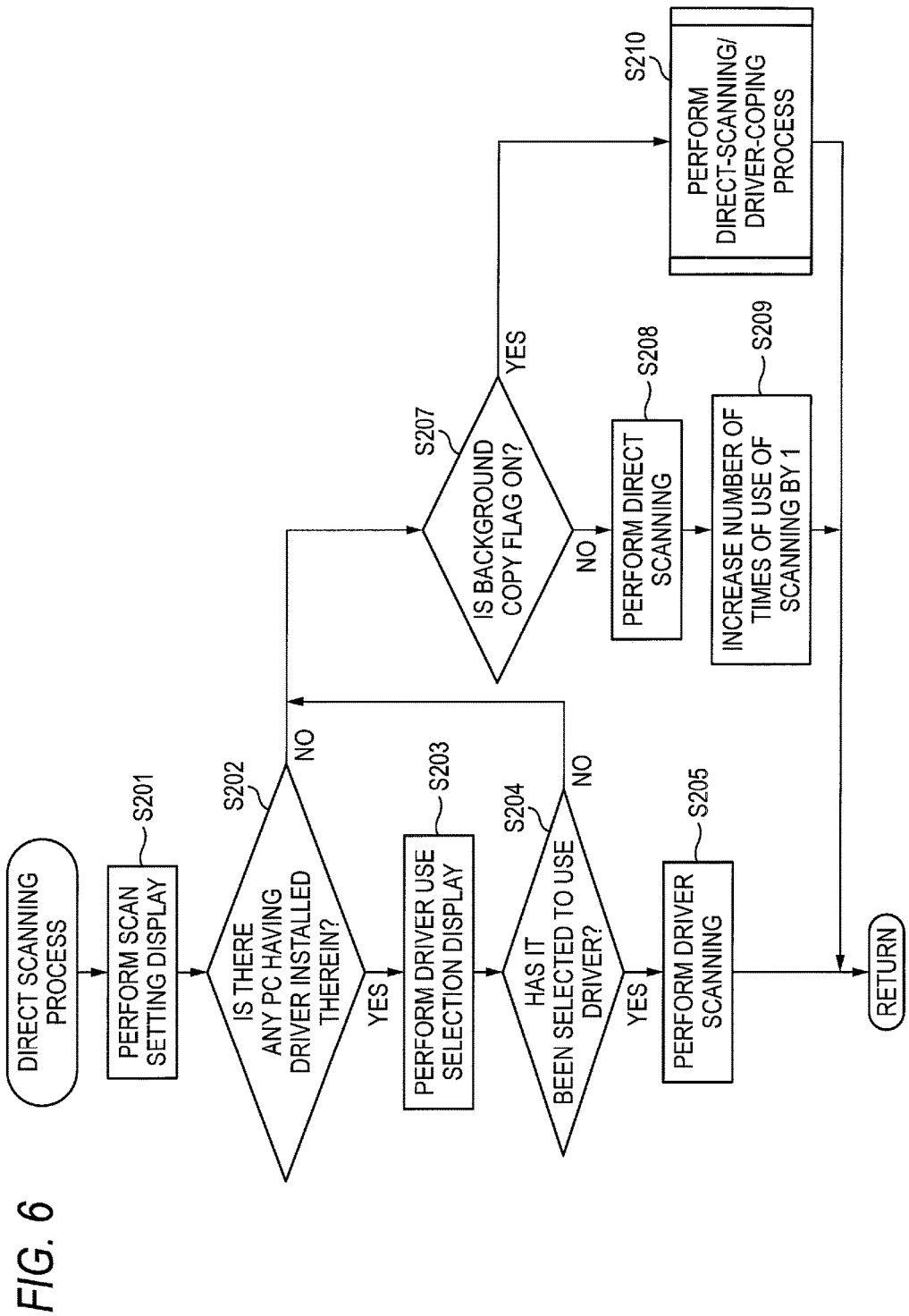
FIG. 6 is a flow chart illustrating a direct scanning process shown in FIG. 3.
Figure 7:
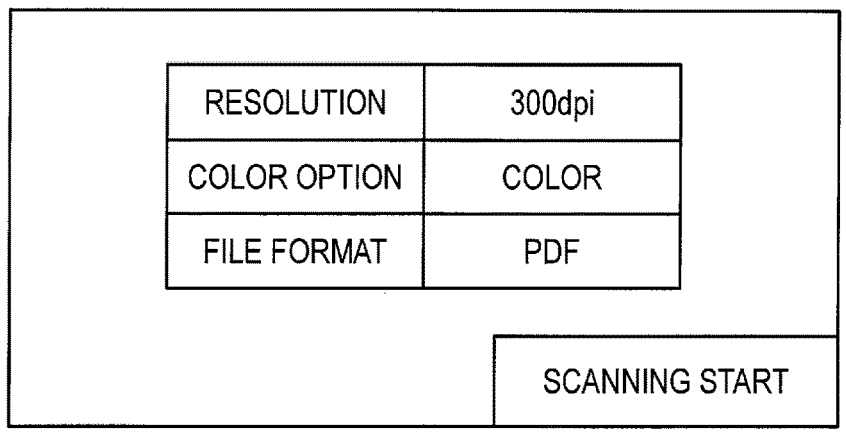
FIG. 7 is a view illustrating the contents of a scan setting display shown in FIG. 6.

Subsequently, the direct scanning process will be described with reference to FIG. 6. As shown in FIG. 6, if the direct scanning process is performed, in STEP S201, the CPU 31 performs control such that the touch panel 36 displays a scan setting screen. As shown in FIG. 7, on the scan setting screen, the user can set a resolution (300 dpi or 600 dpi) and a color option (color or monochrome) for scanning, and a file format (PDF or JPG) for storing. Next, in STEP S202, the CPU 31 determines whether the management file 102a includes a record of any PC 101 having the scanner driver 34b of the MFP 100 installed therein. In the management file 102a, with respect to a PC 101, having any driver installed therein in association with the MFP 100, of PCs 101 having ever used the corresponding USB memory 102, there have been stored the PC name and the name of the installed driver. For example, in FIG. 18, in a paragraph [PC: A] of the PC name "A", with respect to the PC "A", there are driver names (MFC-9970CDW Scan, and MFC-8890DN Scan) of scanner drivers 34b stored as installation information of the scanner drivers 34b, and there are driver names (MFC-9970CDW Print, and MFC-8890DN Print) of printer drivers 34a stored as installation information of the printer drivers 34a.

Figure 8:
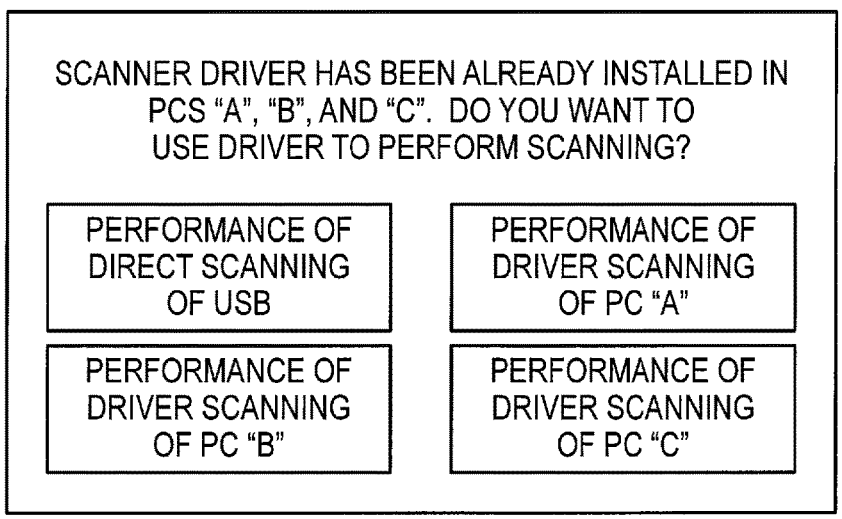
FIG. 8 is a view illustrating the contents of a driver use selection display shown in FIG. 6.

If it determined that the management file 102a includes a record of any PC 101 having the scanner driver 34b of the MFP 100 installed therein ("YES" in STEP S202), in STEP S203, the CPU 31 performs control such that the touch panel 36 displays a selection screen for prompting the user to use the scanner driver 34b of the MFP 100 with respect to each PC 101 whose record exists, as shown in FIG. 8. Subsequently, in STEP S204, the CPU 31 determines whether it has been selected to use the scanner driver 34b. If it is determined that it has been selected to use the scanner driver 34b (to perform driver scanning of any one of PCs "A", "B", and "C") ("YES" in STEP S204), the CPU 31 performs "DRIVER SCANNING" in STEP S205, and then finishes the flow chart of FIG. 6. Meanwhile, if it is determined that it has not been selected to use the scanner driver 34b and it has been selected to perform direct scanning (to perform USB direct scanning) ("NO" in STEP S204), the CPU 31 proceeds to STEP S207.

If it is determined that the management file does not include a record of any PC 101 having the scanner driver 34b of the MFP 100 installed therein ("NO" in STEP S202), the CPU 31 proceeds to STEP S207. In STEP S207, the CPU 31 determines whether the background copy flag is on. If it is determined that the background copy flag is not on ("NO" in STEP S207), the CPU 31 performs "DIRECT SCANNING" in STEP S208, and increases the number of times of use of scanning stored in the management file 102a, by 1, in STEP S209, and then finishes the flow chart of FIG. 6.

Meanwhile, if it is determined that the background copy flag is on ("YES" in STEP S207), the CPU 31 performs a direct-scanning/driver-coping process in STEP S210, and then finishes the flow chart of FIG. 6.

Figure 9:
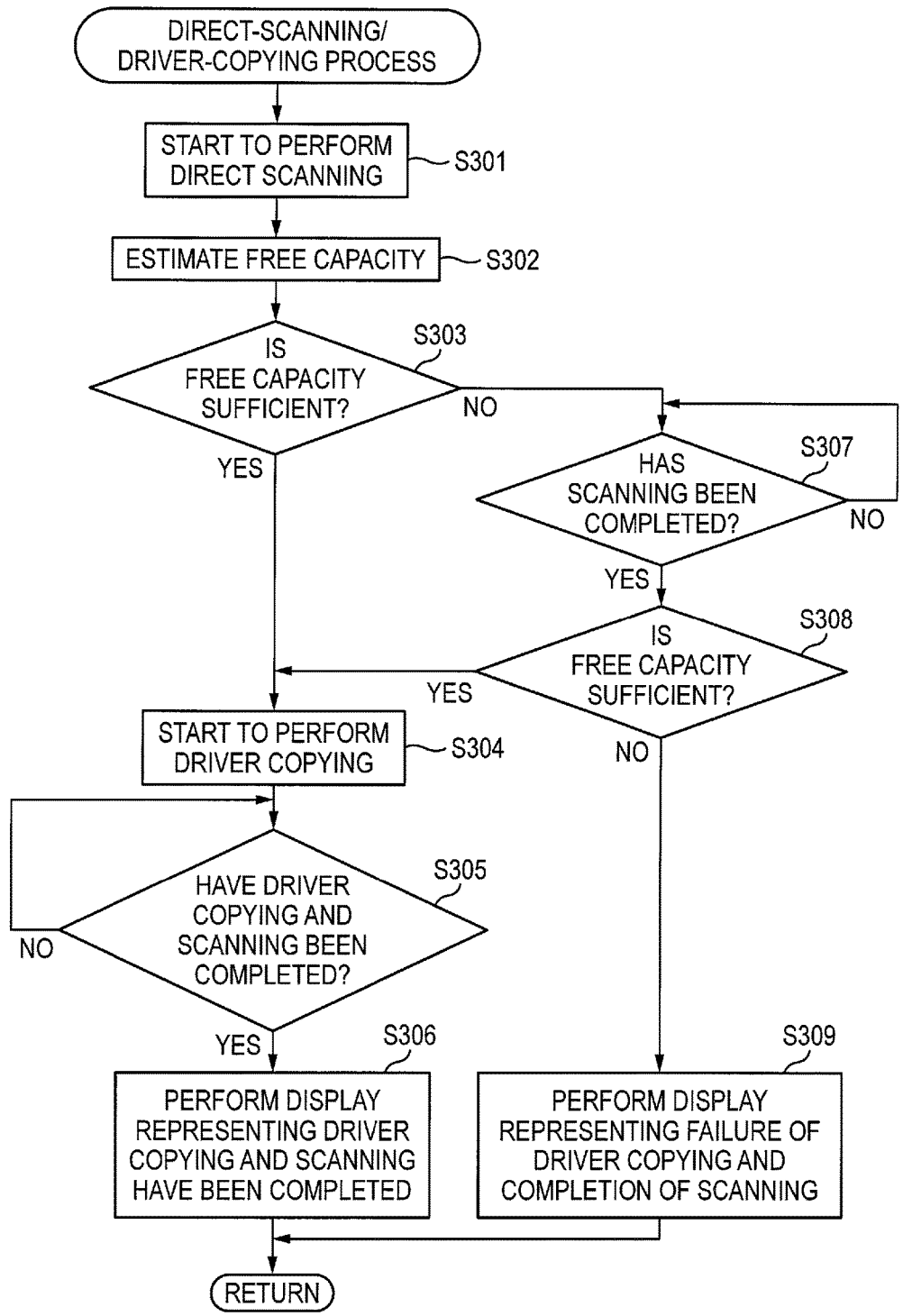
FIG. 9 is a flow chart illustrating a direct-scanning/driver-coping process shown in FIG. 6.

The direct-scanning/driver-coping process will be described with reference to FIG. 9. As shown in FIG. 9, if the direct-scanning/driver-coping process is performed, in STEP S301, the CPU 31 starts to perform "DIRECT SCANNING". Subsequently, in STEP S302, the CPU 31 computes a rough estimate of the capacity of image data to be generated by a scanning operation, on the basis of set parameters, and subtracts the computed capacity of the image data from the current free capacity of the USB memory 102, thereby estimating the free capacity of the USB memory 102. Thereafter, in STEP S303, the CPU 31 determines whether the estimated free capacity is the capacity of a driver to be copied, or more. In a case where it is determined that the estimated free capacity is the capacity of the driver to be copied, or more ("YES" in STEP S303), in STEP S304, the CPU 31 starts to copy the corresponding driver into the USB memory 102. In this case, the CPU 31 copies the management software 34c and the unique information items 34d together with the driver, into the USB memory 102. In a case of installing the management software 34c in a PC 101, a communication environment between the corresponding PC 101 and the MFP 100 is prepared with reference to the unique information items 34d (the IP address and the port number) of the MFP 100.

Figure 10A:
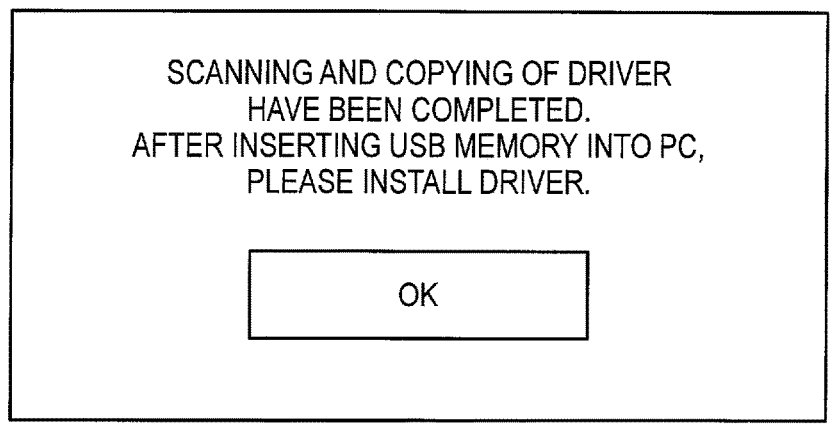
FIGS. 10A and 10B are views illustrating the contents of a scanning completion display shown in FIG. 9.

The CPU 31 waits for the copying of the driver and "DIRECT SCANNING" to be completed ("NO" in STEP S305). If the copying of the driver and "DIRECT SCANNING" are completed ("YES" in STEP S305), in STEP S306, the CPU 31 performs control such that the touch panel 36 performs a display representing that the copying of the driver and "DIRECT SCANNING" have been completed, as shown in FIG. 10A. Then, the CPU 31 finishes the flow chart of FIG. 9.

Figure 10B:
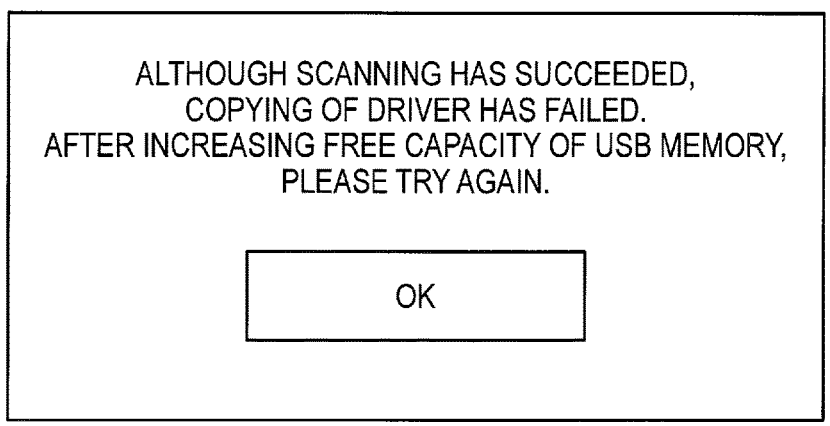

In a case where it is determined that the estimated free capacity is the capacity of the driver to be copied, or more ("NO" in STEP S303), the CPU 31 waits for "DIRECT SCANNING" to be completed ("NO" in STEP S307). If "DIRECT SCANNING" is completed ("YES" in STEP S307), since it is possible to grasp the exact capacity of the image data, in STEP S308, the CPU 31 re-determines whether the free capacity is the capacity of the driver to be copied, or more. In a case where it is determined that the free capacity is the capacity of the driver to be copied, or more ("YES" in STEP S308), the CPU 31 proceeds to STEP S304 in which the CPU 31 starts to copy the corresponding driver into the USB memory 102. Meanwhile, in a case where it is determined that the free capacity is not the capacity of the driver to be copied, or more ("NO" in STEP S308), in STEP S309, the CPU 31 performs control such that the touch panel 36 performs a display representing that the coping of the driver has failed, and "DIRECT SCANNING" has been completed, as shown in FIG. 10B. Then, the CPU 31 finishes the flow chart of FIG. 9.

Figure 11:
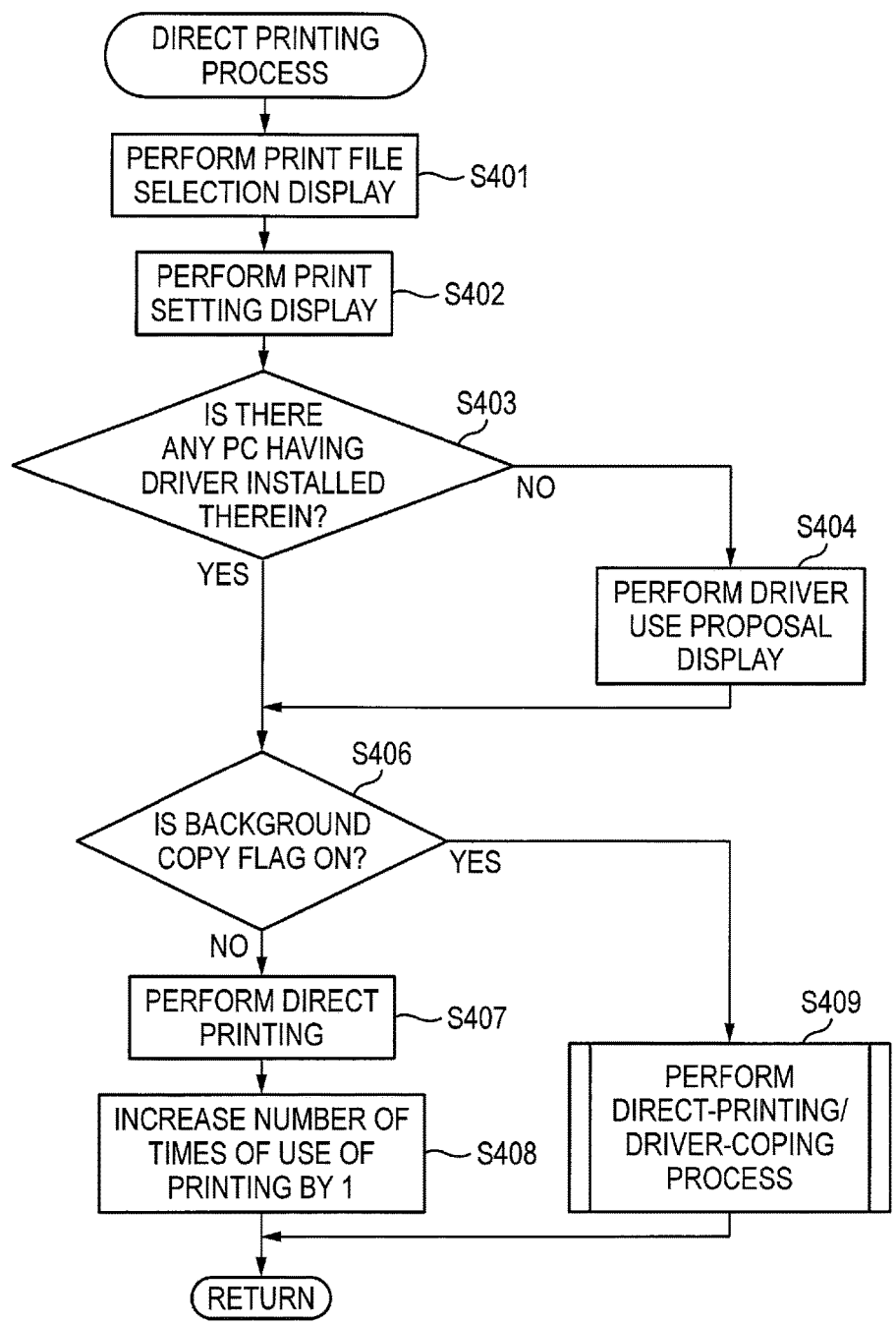
FIG. 11 is a flow chart illustrating a direct printing process shown in FIG. 3.

Subsequently, the direct printing process will be described with reference to FIG. 11. As shown in FIG. 11, if the direct printing process is performed, in STEP S401, the CPU 31 performs control such that the touch panel 36 displays a print file selection screen for prompting the user to select a print file to be printed from a list of print files stored in the USB memory 102, as shown in FIG. 12A. If the user selects a print file, in STEP S402, the CPU 31 performs control such that the touch panel 36 displays a print setting screen. As shown in FIG. 12B, on the print setting screen, the user can set a resolution (300 dpi or 600 dpi), a color option (color or monochrome), and a print layout (2in1 or 4in1) for printing. Next, in STEP S403, the CPU 31 determines whether the management file 102a includes a record of any PC 101 having the printer driver of the MFP 100 installed therein.

If it is determined that the management file 102a includes a record of any PC 101 having the printer driver of the MFP 100 installed therein ("YES" in STEP S403), in STEP S404, the CPU 31 performs control such that the touch panel 36 displays a screen representing that the printer driver 34a of the MFP 100 has been installed in each PC 101 whose record exists, and it is possible to set more options by using the corresponding PC 101 to operate the printer driver, than direct printing, with respect to the corresponding PC 101, as shown in FIG. 13. Thereafter, the CPU 31 proceeds to STEP S406.

Meanwhile, if it is determined that the management file 102a does not include a record of any PC 101 having the printer driver of the MFP 100 installed therein ("NO" in STEP S403), the CPU 31 proceeds to STEP S406. In STEP S406, the CPU 31 determines whether the background copy flag is on. If it is determined that the background copy flag is not on ("NO" in STEP S406), the CPU 31 performs "DIRECT PRINTING" in STEP S407, and increases the number of times of use of printing stored in the management file 102a, by 1, in STEP S408, and finishes the flow chart of FIG. 11. Meanwhile, if it is determined that the background copy flag is on ("YES" in STEP S406), the CPU 31 performs a direct-printing/driver-coping process in STEP S409, and finishes the flow chart of FIG. 11.

Figure 14:
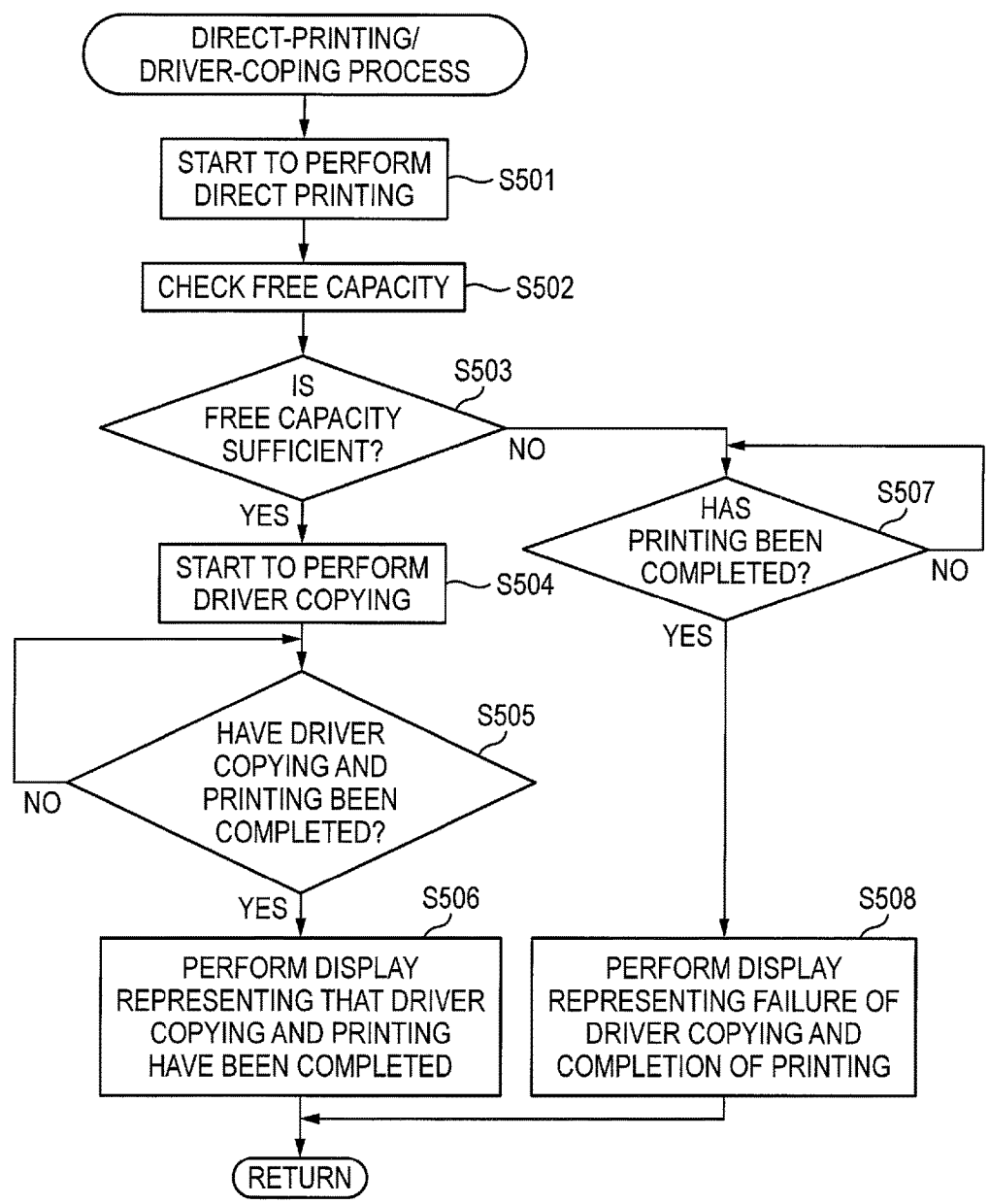
FIG. 14 is a flow chart illustrating a direct-printing/driver-coping process shown in FIG. 11.

The direct-printing/driver-coping process will be described with reference to FIG. 14. As shown in FIG. 14, if the direct-printing/driver-coping process is performed, in STEP S501, the CPU 31 starts to perform "DIRECT PRINTING". Subsequently, in STEP S502, the CPU 31 checks the free capacity of the USB memory 102. Next, in STEP S503, the CPU 31 determines whether the checked free capacity is the capacity of a driver to be copied, or more. In a case where it is determined that the checked free capacity is the capacity of a driver to be copied, or more ("YES" in STEP S503), in STEP S504, the CPU 31 starts to copy the corresponding driver into the USB memory 102. In this case, the CPU 31 copies the management software 34c and the unique information items 34d together with the driver, into the USB memory 102. Then, the CPU 31 waits for the copying of the driver and "DIRECT PRINTING" to be completed ("NO" in STEP S505). If the copying of the driver and "DIRECT PRINTING" are completed ("YES" in STEP S505), in STEP S506, the CPU 31 performs control such that the touch panel 36 performs a display representing that the copying of the driver and "DIRECT PRINTING" have been completed. Then, the CPU 31 finishes the flow chart of FIG. 14.

In a case where it is determined that the checked free capacity is not the capacity of the driver to be copied, or more ("NO" in STEP S503), the CPU 31 waits for "DIRECT PRINTING" to be completed ("NO" in STEP S507). If "DIRECT PRINTING" is completed ("YES" in STEP S507), in STEP S508, the CPU 31 performs control such that the touch panel 36 performs a display representing that the copying of the driver has failed and "DIRECT PRINTING" has been completed. Then, the CPU 31 finishes the flow chart of FIG. 14.

Figure 15:
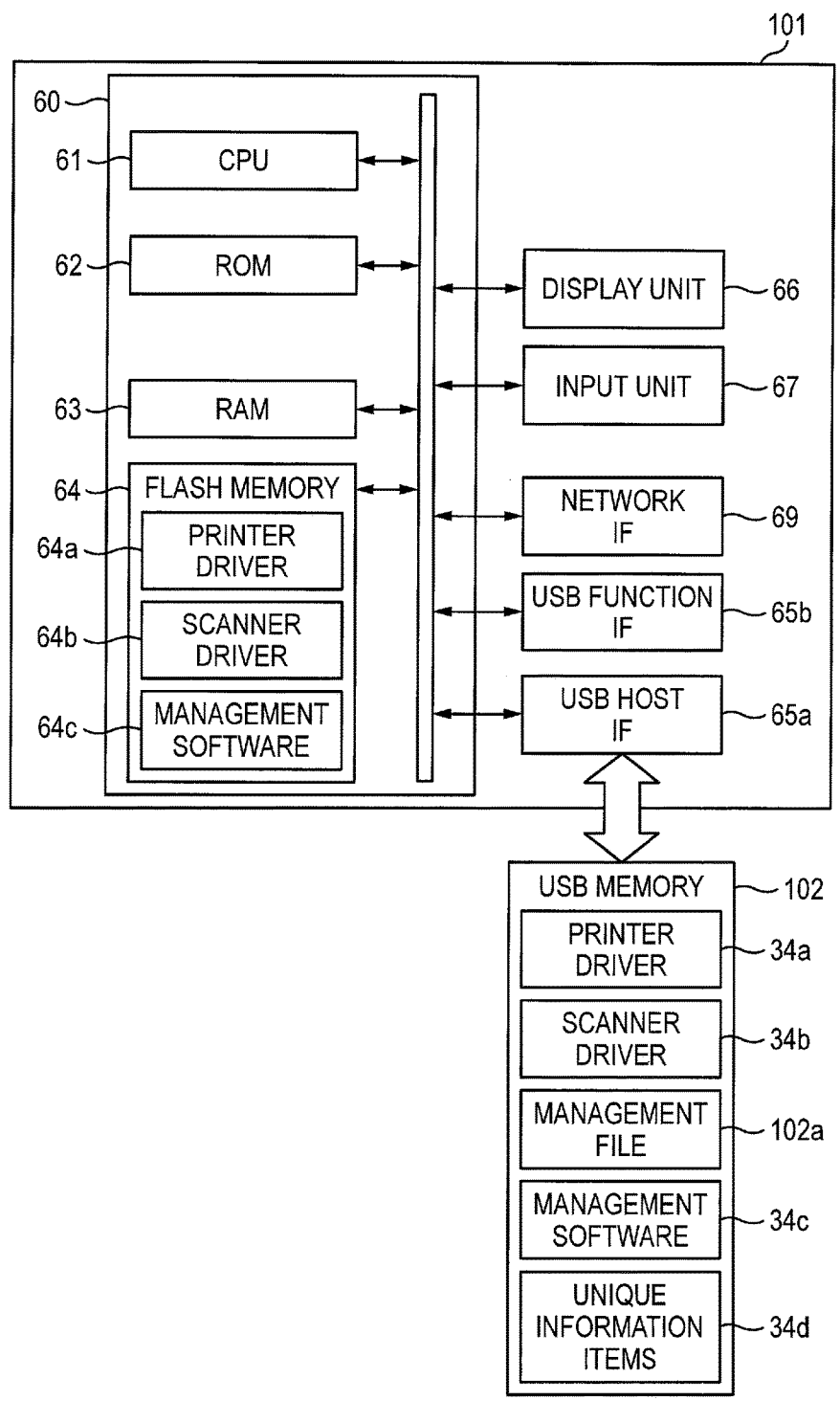
FIG. 15 is a view illustrating the functional blocks of a PC shown in FIG. 1.

The PCs 101 will be described in detail. As shown in FIG. 15, each PC 101 has a control unit 60 which includes a CPU 61, a ROM 62, a RAM 63, and a hard disk drive (HDD) 64. Also, the control unit 60 is electrically connected to a display unit 66 which is a display, an input unit 67 such as a keyboard and a pointing device, a network interface 69, a USB host interface 65a, and a USB function interface 65b. The USB memory 102 can be attached to the USB host interface 65a.

In the ROM 62, there have been stored firmware for controlling the PC 101, a variety of options, initial values, and the like. In the RAM 63 and the HDD 64, there have been stored an operating system (OS), and a variety of control programs which function on the OS. Also, the RAM 63 and the HDD 64 can be used as a work area which is usable when the OS or a program functions, or as a storage area for temporarily storing data.

Also, in the HDD 64, there have been installed a printer driver 64a which is necessary to use the PC 101 to control the printing function of the MFP 100, a scanner driver 64b which is necessary to use the PC 101 to control the scanning function of the MFP 100, and management software 64c.

The network interface 69 is configured to be capable of data communication with other external devices (the MFP 100 and the server 110) through the network. As a communication protocol, TCP/IP is used.

Both of the USB host interface 65a and the USB function interface 65b are interfaces of a USB standard. The USB memory 102 can be attached to or detached from the USB host interface 65a.

Figure 16:
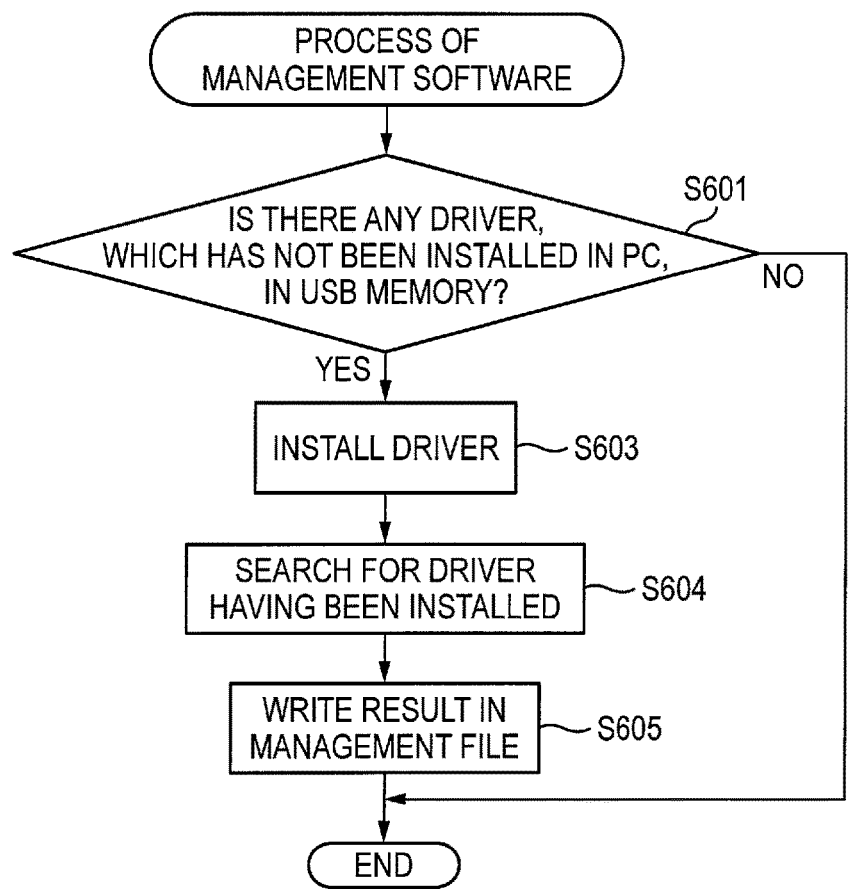
FIG. 16 is a flow chart illustrating an operation procedure of management software shown in FIG. 15.

Subsequently, an operation procedure of the management software 34c installed in a PC 101 will be described with reference to FIG. 16. In a state where the management software 34c has been activated, if the USB memory 102 is attached to the USB host interface 65a, as shown in FIG. 16, in STEP S601, the CPU 61 determines whether any driver which is associated with the MFP 100 and has not been installed in the PC 101 has been stored in the USB memory 102. In a case of determining that any driver associated with the MFP 100 has not been stored in the USB memory 102, or that a driver associated with the MFP 100 has been stored in the USB memory 102 and has been already installed in the PC 101 ("NO" in STEP S601), the CPU 61 finishes the flow chart of FIG. 16. Meanwhile, if it is determined that a driver which is associated with the MFP 100 and has not been installed in the PC 101 has been stored in the USB memory 102 ("YES" in STEP S601), in STEP S603, the CPU 61 installs the driver stored in the USB memory 102. When the driver is installed, a communication environment with the MFP 100 is also established using the unique information items 34d (the IP address). In STEP S604, the PC 101 searches for the driver which is associated with the MFP 100 and has been already installed in the PC 101, and the IP address of the MFP 100. Thereafter, the PC 101 writes the search result associated with the corresponding PC 101, in the management file 102a shown in FIG. 18, in STEP S605, and finishes the flow chart of FIG. 16.

Figure 17:
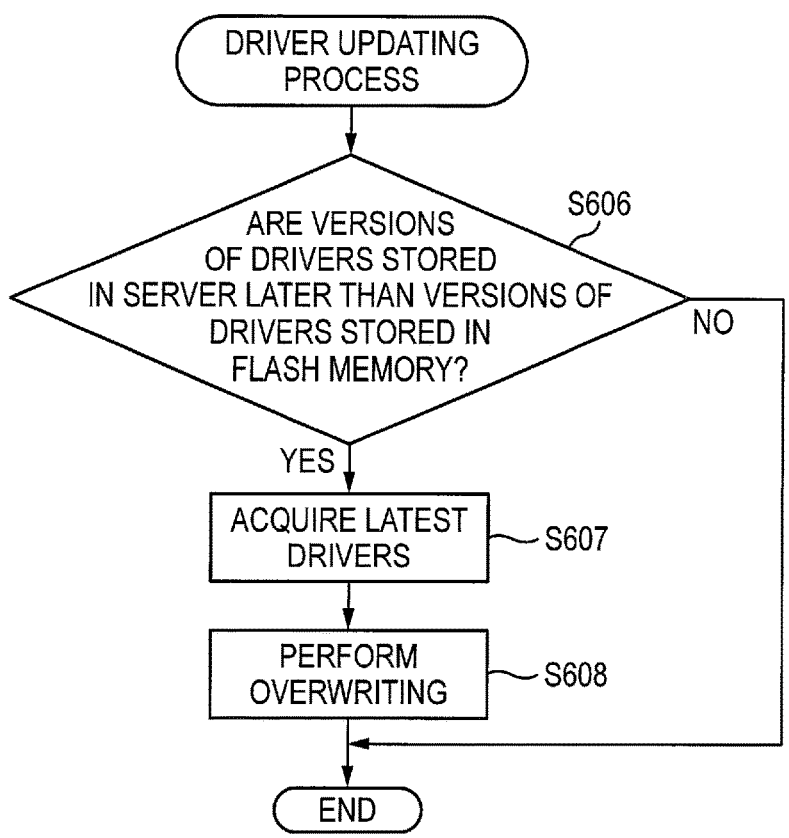
FIG. 17 is a flow chart illustrating the operation procedure of a driver updating process of a PC shown in FIG. 1.

The CPU 61 regularly performs a driver updating process. As shown in FIG. 17, in STEP S606, the CPU 61 determines whether the printer driver 34a and the scanner driver 34b stored in the server 110 are later than the versions of the printer driver 64a and the scanner driver 64b stored in the HDD 64. If it is determined that the printer driver 34a and the scanner driver 34b stored in the server 110 are not later than the versions of the printer driver 64a and the scanner driver 64b stored in the HDD 64 ("NO" in STEP S606), the CPU 61 finishes the flow chart of FIG. 17. Meanwhile, if it is determined that the printer driver 34a and the scanner driver 34b stored in the server 110 are later than the versions of the printer driver 64a and the scanner driver 64b stored in the HDD 64 ("YES" in STEP S606), the CPU 61 acquires the latest printer driver 34a and the latest scanner driver 34b from the server 110 in STEP S607, and overwrites (updates) the printer driver 64a and the scanner driver 64b stored in the HDD 64, with the latest printer driver 34a and the latest scanner driver 34b. Then, the CPU 61 finishes the flow chart of FIG. 17.

As described above in detail, according to the MFP 100 of the present illustrative embodiment, since a possibility that the scanner driver 34b or the printer driver 34a has been installed in the PC 101 of the user using the USB memory 102 is low, each driver is stored in the USB memory 102. Therefore, the user can prepare an installation environment of each driver without putting time and effort.

Also, the number of times of use of scanning and the number of times of use of printing are stored, and every time when "DIRECT SCANNING" or "DIRECT PRINTING" is performed, the number of times of use of scanning or the number of times of use of printing is increased. If the sum of the number of times of use of scanning and the number of times of use of printing is three or more, the scanner driver 34b or the printer driver 34a is stored in the USB memory 102. Therefore, only in a case where the frequency of use is high, each driver is stored in the USB memory 102. Therefore, it is possible to suppress the capacity of the USB memory 102 from being wastefully consumed.

Further, in a case where it is confirmed that the versions of the printer driver 64a and the scanner driver 64b stored in the HDD 64 are earlier than the versions of the printer driver 34a and the scanner driver 34b of the server 110, a PC downloads the latest printer driver 34a and the latest scanner driver 34b and overwrites the printer driver 64a from the server 110, and the scanner driver 64b stored in the HDD 64, with the latest printer driver 34a and the latest scanner driver 34b. Therefore, it is possible to prepare the latest drivers.

In addition, according to the management software 34c, information whether the scanner driver 34b or the printer driver 34a has been installed in a PC 101 is stored as the management file 102a in the USB memory 102, and if the CPU 31 finds out that the scanner driver 34b or the printer driver 34a has been installed, with reference to the management file 102a, the CPU 31 does not store the corresponding driver in the USB memory 102. Therefore, it is possible to suppress the capacity of the USB memory 102 from being wastefully consumed.

Also, in a case where the CPU 31 finds out that a driver has been installed in a PC 101, on the basis of the management file 102a, the CPU 31 performs control such that the touch panel 36 displays a screen for proposing to use the corresponding PC 101 to perform an operation, the convenience of the user is improved.

Further, the CPU 31 performs control such that the touch panel 36 displays a driver-copying selection screen for prompting the user to select whether to copy a driver into the USB memory 102, and copies the corresponding driver into the USB memory 102 on the basis of the result of selection of the user. Therefore, it is possible to suppress the capacity of the USB memory 102 from being wastefully consumed.

First Modification

Figure 19:
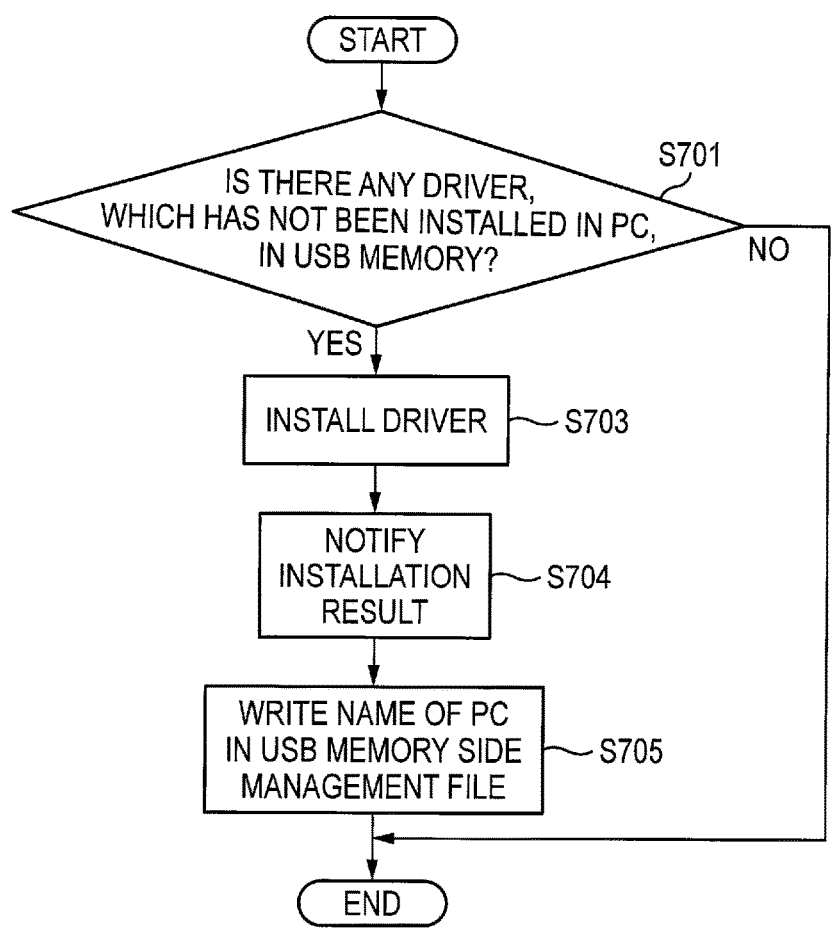
FIG. 19 is a flow chart illustrating an operation procedure according to a first modification.

A modification of the above described illustrative embodiment will be described with reference to FIGS. 19 to 21B. In the above described illustrative embodiment, the management file 102a is stored in the USB memory 102. However, a portion of the management file may be stored in the flash memory 34 of the MFP 100. An operation procedure of the management software installed in a PC 101 in the above described case will be described. In a state where the management software has been activated, if the USB memory 102 is attached to the USB host interface 65a, as shown in FIG. 19, in STEP S701, the CPU 61 determines whether any driver which is associated with the MFP 100 and has not been installed in the PC 101 has been stored in the USB memory 102. In a case of determining that any driver associated with the MFP 100 has not been stored in the USB memory 102, or that a driver associated with the MFP 100 has been stored in the USB memory 102 and has been already installed in the PC 101 ("NO" in STEP S701), the CPU 61 finishes the flow chart of FIG. 19. Meanwhile, if it is determined that a driver which is associated with the MFP 100 and has not been installed in the PC 101 has been stored in the USB memory 102 ("YES" in STEP S701), in STEP S703, the CPU 61 installs the driver. When the driver is installed, a communication environment with the MFP 100 is also established using the unique information items 34d (the IP address). Thereafter, the PC 101 notifies the installation result to the MFP 100 in STEP S704, and writes the name (for example, "A") of the PC 101 in the USB memory side management file shown in FIG. 21B, in STEP S705, and then finishes the flow chart of FIG. 19.

Figure 20:
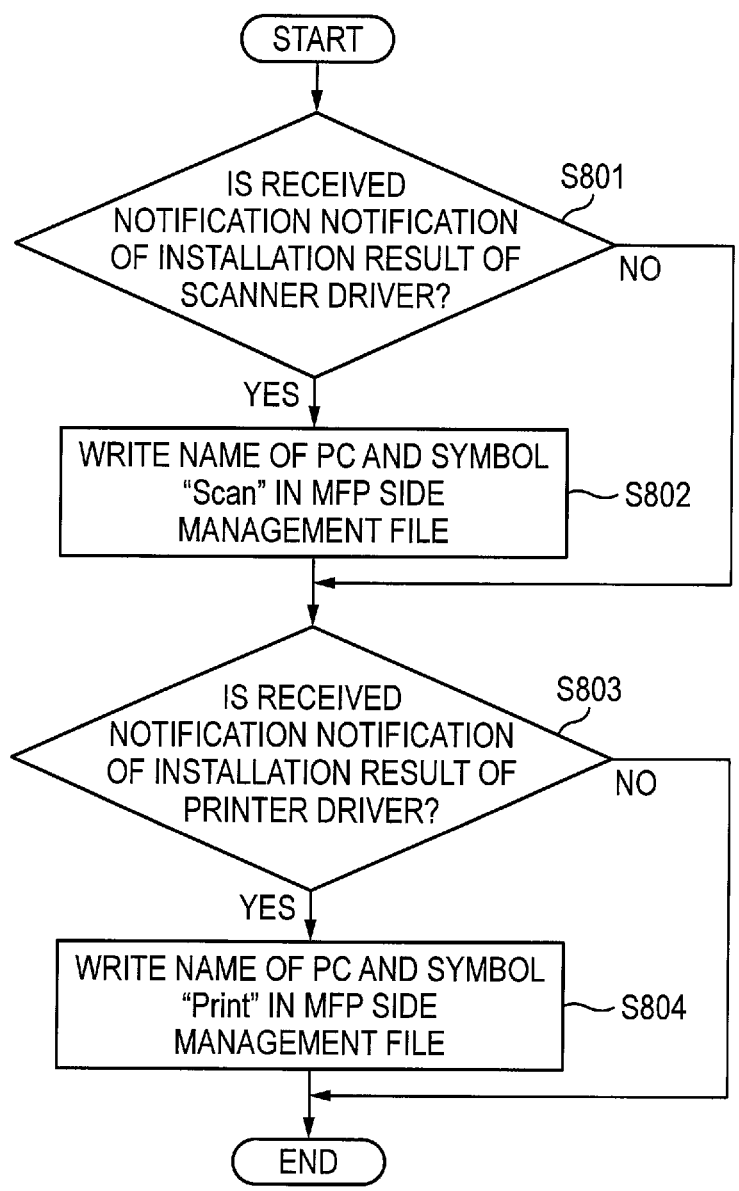
FIG. 20 is a flow chart illustrating another operation procedure according to the first modification.

Meanwhile, in the MFP 100, if the notification of the installation result is received from the PC 101, as shown in FIG. 20, in STEP S801, the CPU 31 determines whether the received notification is a notification of an installation result of the scanner driver 34b. In a case of determining that the received notification is a notification of an installation result of the scanner driver 34b ("YES" in STEP S801), in STEP S802, the CPU 31 writes the name of the PC which is the transmission source, and a symbol "Scan" representing that the scanner driver 34b has been installed, in the MFP side management file stored in the flash memory 34 and shown in FIG. 21A. Thereafter, in STEP S803, the CPU 31 determines whether the received notification is a notification of an installation result of the printer driver 34a. In a case of determining that the received notification is a notification of an installation result of the printer driver 34a ("YES" in STEP S803), in STEP S804, the CPU 31 writes the name of the PC which is the transmission source, and a symbol "Print" representing that the printer driver 34a has been installed, in the MFP side management file stored in the flash memory 34 and shown in FIG. 21A. Then, the CPU 31 finishes the flow chart of FIG. 20.

Second Modification

Figure 22:
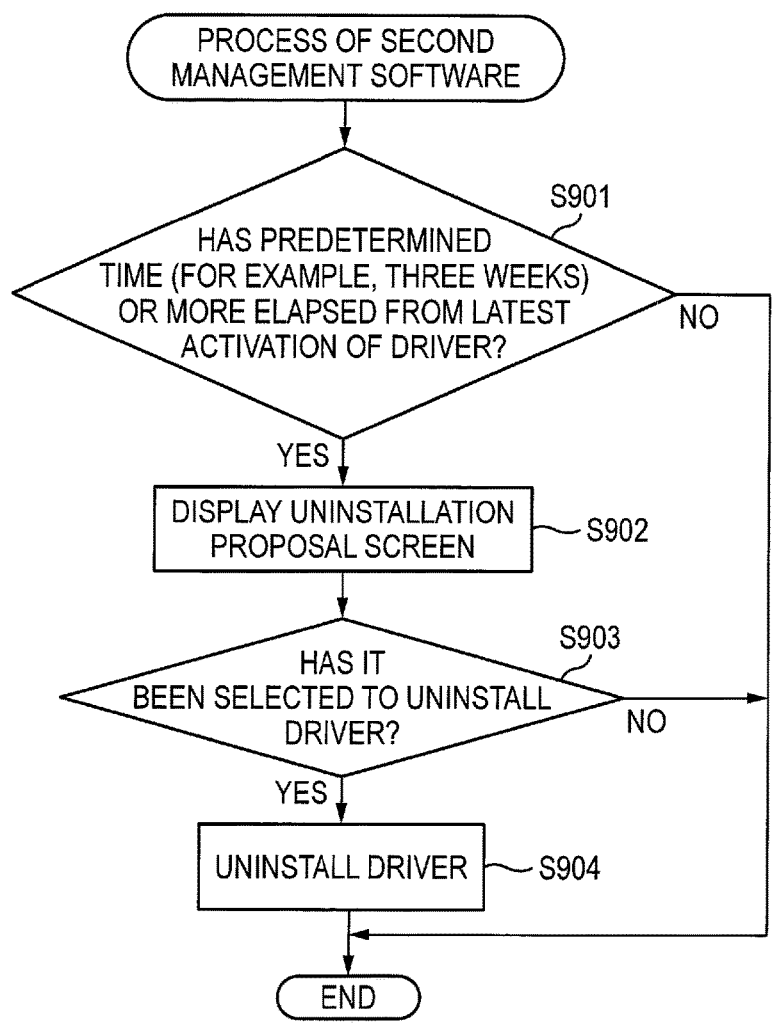
FIG. 22 is a flow chart illustrating an operation procedure according to a second modification.

In the above described illustrative embodiment, the management software 34c includes first management software 34c1 configured to perform the process shown in FIG. 16, and second management software 34c2 which is a program resident in a PC 101. As shown in FIG. 22, in STEP S901, the CPU 61 which executes the management software determines whether a predetermined time (for example, three weeks) or more has elapsed from the latest activation of a driver. If it is determined that the predetermined time or more has not elapsed from the latest activation of the driver ("NO" in STEP S901), the CPU 61 finishes the flow chart of FIG. 22. Meanwhile, if it is determined that the predetermined time or more has elapsed from the latest activation of the driver ("YES" in STEP S901), in STEP S902, the CPU 61 performs control such that the display unit 66 displays a proposal screen for prompting the user to uninstall the driver. Thereafter, in STEP S903, the CPU 61 determines whether the user has selected to uninstall the driver, on the basis of a signal received from the input unit 67. If it is determined that the user has not selected to uninstall the driver ("NO" in STEP S903), the CPU 61 finishes the flow chart of FIG. 22. Meanwhile, if it is determined that the user has selected to uninstall the driver ("YES" in STEP S903), the CPU 61 uninstalls the driver in STEP S904, and then finishes the flow chart of FIG. 22.

The illustrative embodiments are merely illustrative and not restrictive of this disclosure. Therefore, needless to say, this disclosure can be improved and modified within a scope which does not diverge from the gist. For example, in the above described illustrative embodiment, the drivers are copied into the USB memory 102. However, instead of the drivers, commands for acquiring the drivers may be copied. In this case, instead of the printer driver 34a, the scanner driver 34b, and the management software 34c, commands for acquiring them from the server 110 are stored in the flash memory 34. Then, if the USB memory 102 is inserted into the USB host interface of a PC 101, the commands are performed by the CPU 61 of the PC 101. As a result, the CPU 61 accesses the server 110, and acquires the drivers and the management software designated by the command. The subsequent process is the same as that of the above described illustrative embodiment.

Also, in the above described illustrative embodiment, the scanner driver 34b and the printer driver 34a can be copied into the USB memory 102. However, only any one of the scanner driver 34b and the printer driver 34a can be copied into the USB memory 102. This is the same even in the case of using commands instead of the drivers.

Also, in the above described illustrative embodiment, if the sum of the number of times of use of scanning and the number of times of use of printing is three or more, the scanner driver 34b or the printer driver 34a is stored in the USB memory 102. However, if the number of times of use of scanning is a predetermined value or more, the scanner driver 34b may be stored in the USB memory 102, and if the number of times of use of printing is a predetermined value or more, the printer driver 34a may be stored in the USB memory 102. Alternatively, regardless of the number of times of use of scanning and the number of times of use of printing, the scanner driver 34b or the printer driver 34a may be stored in the USB memory 102.

Further, in the above described illustrative embodiment, the CPU 61 downloads the latest printer driver 34a and the latest scanner driver 34b from the server 110, and overwrites the printer driver 64a and the scanner driver 64b stored in the HDD 64, with the latest printer driver 34a and the latest scanner driver 34b. However, this updating may not be performed.

In addition, in the above described illustrative embodiment, according to the management software 34c, information whether the scanner driver 34b or the printer driver 34a has been installed in a PC 101 is stored as the management file 102a in the USB memory 102. However, information whether the scanner driver 34b or the printer driver 34a has been installed may not be managed. In this case, regardless of whether the scanner driver 34b or the printer driver 34a has been installed, each driver may be stored in the USB memory 102.

Also, in the above described illustrative embodiment, in a case where the CPU 31 finds out that a driver has been installed in a PC 101, on the basis of the management file 102a, the CPU 31 performs control such that the touch panel 36 displays a screen for proposing to use the corresponding PC 101 to perform an operation. However, the CPU may not perform control such that the touch panel 36 displays that proposal screen.

Further, the CPU 31 performs control such that the touch panel 36 displays a driver-copying selection screen for prompting the user to select whether to copy a driver into the USB memory 102, and copies the corresponding driver into the USB memory 102 on the basis of the result of selection of the user. However, the CPU may copy the driver into the USB memory 102, without asking the user to select.

In the above described illustrative embodiment, as an example of the external memory, the USB memory 102 has been described. However, the external memory may be a memory other than the USB memory 102. For example, the external memory may be an SD card, CompactFlash (registered as a trademark), a device (such as a portable terminal or an ID card) which is readable and writable by the MFP through NFC, or the like. Also, in a case where user authentication information has been stored in the external memory, user authentication may be performed and then direct printing or direct scanning may be performed.

In FIG. 6 of the above described illustrative embodiment, after STEP S205 is performed, the CPU does not perform driver copying. However, even after STEP S205, the CPU may determine whether the background copy flag is on or off. If the background copy flag is on, the CPU may perform driver copying.

In the above described illustrative embodiment, after direct printing is received, the printer driver 34a is copied. However, in this case, the scanner driver 34b may also be copied. Also, in the above described illustrative embodiment, after direct scanning is received, the scanner driver 34b is copied. However, in this case, the printer driver 34a may also be copied.

Although an example obtained by applying this disclosure to an MFP having a printing function and a scanning function has been described, this disclosure can be applied to any other information processing apparatus (for example, a printer, a FAX, or a scanner) having only any one of a printing function and a scanning function.

What is claimed is:

1. An information processing apparatus comprising:
an image reading unit configured to perform image reading of reading an image formed on a document;
an interface to which an external memory is detachably attached;
an input unit configured to receive an instruction of a user;
a storage unit configured to store at least one of a reading driver of controlling the image reading unit and a reading driver-command, the reading driver-command comprising a command to acquire the reading driver from an external device via a network interface; and
a control unit configured to:
receive, from the input unit, a reading instruction of storing the image data, which is acquired by performing image reading, in the external memory attached to the interface; and
perform, when receiving the reading instruction of storing the image data, a reading driver-data storing process of storing both the image data read by the image reading unit and at least one of the reading driver stored in the storage unit and the reading driver-command, into the external memory attached to the interface.

2. An information processing apparatus comprising:
an image recording unit configured to perform image recording of recording an image onto a recording medium;
an interface to which an external memory is detachably attached;
an input unit configured to receive an instruction of a user;

a storage unit configured to store at least one of a recording driver of controlling the image recording unit and a recording driver-command, the recording driver-command comprising a command to acquire the recording driver from an external device via a network interface; and a control unit configured to:

receive, from the input unit, a recording instruction controlling the image recording unit to record an image according to the image data, which is stored in the external memory attached to the interface, onto a recording medium; and perform a recording driver-data storing process of storing at least one of the recording driver stored in the storage unit and the recording driver-command, into the external memory attached to the interface.

3. An information processing apparatus comprising:

an image reading unit configured to perform image reading of reading an image formed on a document;

an image recording unit configured to perform image recording of recording an image onto a recording medium;

an interface, to which an external memory is detachably attached;

an input unit configured to receive an instruction of a user;

a storage unit configured to store: at least one of a reading driver of controlling the image reading unit, and a reading driver-command, the reading driver-command comprising a command to acquire the reading driver from an external device via a network interface; and at least one of a recording driver of controlling the image recording unit and a recording driver-command, the recording driver-command comprising a command to acquire the recording driver from an external device via the network interface; and a control unit, configured to receive, from the input unit, a reading instruction of storing the image data, which is acquired by performing image reading, in the external memory attached to the interface;

perform, when receiving the reading instruction of storing the image data, a reading driver-data storing process of storing both the image data and at least one of the reading driver and the reading driver-command in the external memory attached to the interface;

receive, from the input unit, a recording instruction controlling the image recording unit to record an image according to the image data, which is stored in the external memory attached to the interface, onto a recording medium; and perform a recording driver-data storing process of storing at least one of the recording driver stored in the storage unit and the recording driver-command, into the external memory attached to the interface.

4. The information processing apparatus according to claim 1, wherein the control unit is configured to:

store, every time when the reading instruction is received from the input unit, a cumulative reading number which is a cumulative number of times where the reading instruction has been received from the input unit, in the external memory; and perform, when the cumulative reading number exceeds a predetermined threshold value, the reading driver-data storing process.

5. The information processing apparatus according to claim 2, the control unit is configured to:

store, every time when the recording instruction is received from the input unit, the control unit stores a cumulative recording number, which is a cumulative number of times where the recording instruction has been received from the input unit, in the external memory; and perform when a cumulative recording number exceeds a predetermined threshold value, the recording driver-data storing process.

6. The information processing apparatus according to claim 3, wherein the control unit is configured to:

store, every time when each the reading instruction and the recording instruction is received from the input unit, stores a sum of the cumulative reading number, which is the cumulative number of times where the reading instruction has been received from the input unit, and a cumulative recording number, which is the cumulative number of times where the recording instruction has been received, in the external memory, and wherein in a case where the sum exceeds a predetermined threshold value, the control unit performs at least the reading driver-data storing process if the received latest command is the reading instruction, and the control unit performs at least the recording driver-data storing process if the received latest command is the recording instruction.

7. The information processing apparatus according to claim 1, further comprising:

a communication unit configured to perform data communication with an external device, wherein the information processing apparatus is capable of data communication with a server having the reading driver, through the communication unit, wherein the storage unit has the reading driver, and wherein if the reading driver stored in the server is later than the reading driver stored in the storage unit, the control unit acquires the reading driver stored in the server, from the server through the communication unit, and overwrites the reading driver stored in the storage unit, with the acquired reading driver.

8. The information processing apparatus according to claim 2, further comprising:

a communication unit configured to perform data communication with an external device, wherein the information processing apparatus is capable of data communication with a server having the recording driver, through the communication unit, wherein the storage unit has the recording driver, and wherein if the recording driver stored in the server is later than the recording driver stored in the storage unit, the control unit acquires the recording driver stored in the server, from the server through the communication unit, and overwrites the recording driver stored in the storage unit, with the acquired recording driver.

9. The information processing apparatus according to claim 1, wherein the storage unit further stores a first information-terminal program, wherein the first information-terminal program is readable by an information terminal and controls the information terminal such that, after the reading driver stored in the external memory is installed in the information terminal, the information terminal stores reading-driver installation information representing completion of installation of the reading driver, in the external memory, wherein in the reading driver-data storing process, the control unit performs control such that the reading driver and the first information-terminal program are stored in the external memory, and wherein in a case where the reading-driver installation information has been stored in the external memory, if the reading instruction is input to the input unit, the control unit does not perform the reading driver-data storing process.

10. The information processing apparatus according to claim 1, wherein the storage unit has the reading driver-command, wherein the reading driver-command acquires both the imaging driver and a first information-terminal program from an external, wherein the first information-terminal program is readable by an information terminal and controls the information terminal such that, after the reading driver stored in the external memory is installed in the information terminal, the information terminal stores reading-driver installation information representing completion of installation of the reading driver, in the external memory, and wherein in a case where the reading-driver installation information has been stored in the external memory, if the reading instruction is input to the input unit, the control unit does not perform the reading driver-data storing process.

11. The information processing apparatus according to claim 2, wherein the storage unit further stores a first information-terminal program, wherein the first information-terminal program is readable by an information terminal and controls the information terminal such that, after the recording driver stored in the external memory is installed in the information terminal, the information terminal stores recording-driver installation information representing completion of installation of the recording driver, in the external memory, wherein, in the recording driver-data storing process, the control unit performs control such that both the recording driver and the first information-terminal program are stored in the external memory, and wherein in a case where the recording-driver installation information has been stored in the external memory, if the recording instruction is input to the input unit, the control unit does not perform the recording driver-data storing process.

12. The information processing apparatus according to claim 2, wherein the storage unit has the recording driver-command, wherein the recording driver-command acquires both the recording driver and a first information-terminal program from an external, wherein the first information-terminal program is readable by an information terminal and controls the information terminal such that after the recording driver stored in the external memory is installed in the information terminal, the information terminal stores recording-driver installation information, representing completion of installation of the recording driver, in the external memory, and wherein in a case where the recording-driver installation information has been stored in the external memory, if the recording instruction is input to the input unit, the control unit does not perform the recording driver-data storing process.

13. The information processing apparatus according to claim 9, further comprising:

a display unit, wherein in a case where the reading instruction is received from the input unit in a state where the external memory has been attached to the interface, if the reading-driver installation information is in the external memory, the control unit controls such that the display unit displays a display content for prompting a user to transmit the image data to the information terminal in which the reading driver has been installed.

14. The information processing apparatus according to claim 1, further comprising:

a display unit, wherein if the reading instruction is input to the input unit, the control unit performs control such that the display unit displays a selection screen for prompting a user to select whether the reading driver is necessary or not, and wherein if the result of selection of the user representing that the reading driver is necessary is received from the input unit, the control unit performs such that at least one of the reading driver and the reading driver-command is stored in the external memory attached to the interface.

15. The information processing apparatus according to claim 2, further comprising:

a display unit, wherein if the recording instruction is input to the input unit, the control unit performs such that the display unit displays a selection screen for prompting a user to select whether the recording driver is necessary or not, and wherein if the result of selection of the user representing that the recording driver is necessary is received from the input unit, the control unit performs such that at least one of the recording driver and the recording driver-command is stored in the external memory attached to the interface.

16. The information processing apparatus according to claim 3, wherein the storage unit stores all of the reading driver and the recording driver and a first information-terminal program and a second information-terminal program, wherein the first information-terminal program is readable by an information terminal and controls the information terminal such that if the reading driver stored in the external memory is installed, the information terminal stores reading-driver installation information representing completion of installation of the reading driver, in the external memory, and wherein the information terminal determines whether the reading driver has been installed, wherein if it is determined that the reading driver has been installed, the information terminal further stores reading-driver installation information representing that the reading driver has been installed in the information terminal, in the external memory, and wherein the second information-terminal program is readable by an information terminal and controls the information terminal such that if the recording driver stored in the external memory is installed, the information terminal stores recording-driver installation information representing completion of installation of the recording driver, in the external memory, and the information terminal determines whether the recording driver has been installed, wherein if it is determined that the recording driver has been installed, the information terminal further stores recording-driver installation information, representing that the recording driver has installed, in the external memory, wherein, in the reading driver-data storing process, the control unit performs control such that both the reading driver and the first information-terminal program are stored in the external memory, wherein, in the recording driver-data storing process, the control unit performs control such that both the recording driver and the second information-terminal program are stored in the external memory, and wherein in a case where the reading instruction or the recording instruction has been received from the input unit, the control unit does not perform the reading driver-data storing process if the reading-driver installation information has been stored in the external memory, and the control unit does not perform the recording driver-data storing process if the recording-driver installation information has been stored in the external memory.

17. The information processing apparatus according to claim 3, wherein the storage unit stores both the reading driver-command and the recording driver-command, wherein the reading driver-command acquires the reading driver and a first information-terminal program from an external, wherein the first information-terminal program is readable by an information terminal and controls the information terminal such that if the reading driver is installed, the information terminal stores reading-driver installation information representing completion of installation of the reading driver, in the external memory, and the information terminal determines whether the reading driver has been installed, wherein if it is determined that the reading driver has been installed, the information terminal further stores reading-driver installation information, representing that the reading driver has been installed in the information terminal, in the external memory, wherein the recording driver-command acquires the recording driver and a second information-terminal program from an external, wherein the second information-terminal program is readable by an information terminal and controls the information terminal such that if the recording driver is installed, the information terminal stores recording-driver installation information representing completion of installation of the recording driver, in the external memory, and the information terminal determines whether the recording driver has been installed, wherein if it is determined that the recording driver has been installed, the information terminal further stores recording-driver installation information representing that the recording driver has installed, in the external memory, and wherein in a case where the reading instruction or the recording instruction has been received from the input unit, the control unit does not perform the reading driver-data storing process if the reading-driver installation information has been stored in the external memory, and the control unit does not perform the recording driver-data storing process if the recording-driver installation information has been stored in the external memory.

18. The information processing apparatus according to claim 1, further comprising:

a communication unit configured to perform data communication based on an external device and unique information items, wherein in at least one of the reading driver-data storing process and the recording driver-data storing process, the control unit controls such that unique information items of the information terminal associated with the data communication are stored in the external memory.

19. The information processing apparatus according to claim 1, wherein the storage unit stores the reading driver and a second information-terminal program, wherein the second information-terminal program is executable in a information terminal and controls the information terminal such that in a case where the reading driver stored in the external memory is installed and the corresponding reading driver is not activated for a predetermined period, the information terminal uninstalls the reading driver, and wherein in the reading driver-data storing process, the control unit controls such that both the reading driver and the second information-terminal program are stored in the external memory.

20. The information processing apparatus according to claim 1, wherein the storage unit has the reading driver-command, and wherein the reading driver-command acquires the reading driver and a second information-terminal program from an external, wherein the second information-terminal program is executable in a information terminal and controls the information terminal such that in a case where the reading driver is installed and the corresponding reading driver is not activated for a predetermined period, the information terminal uninstalls the reading driver.

21. The information processing apparatus according to claim 1, wherein the storage unit stores both the recording driver and a second information-terminal program, wherein the second information-terminal program is executable in a information terminal and controls the information terminal such that in a case where the recording driver stored in the external memory is installed and the corresponding recording driver is not activated for a predetermined period, the information terminal uninstalls the recording driver, and wherein in the recording driver-data storing process, the control unit controls such that both the recording driver and the second information-terminal program are stored in the external memory.

22. The information processing apparatus according to claim 2, wherein:

wherein the storage unit stores the recording driver-command, and wherein the recording driver-command acquires the recording driver and a second information-terminal program from an external, wherein the second information-terminal program is executable in a information terminal and controls the information terminal such that in a case where the recording driver is installed and the corresponding recording driver is not activated for a predetermined period, the information terminal uninstalls the recording driver.

\* \* \* \* \*